May 22, 1934.   A. A. EVENO   1,959,620

LOCK NUT AND WASHER

Filed Dec. 4, 1930   2 Sheets-Sheet 1

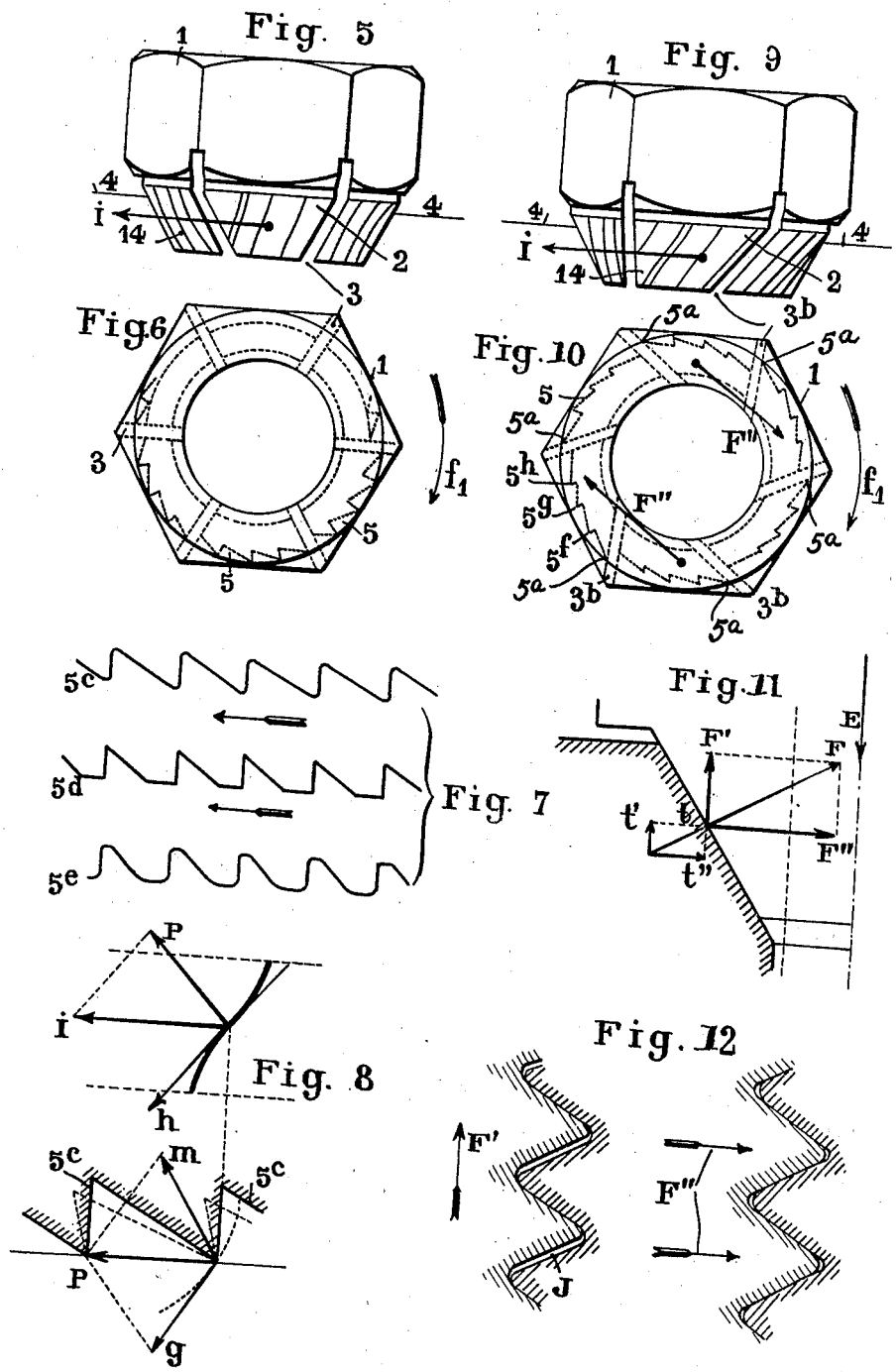

Patented May 22, 1934

1,959,620

UNITED STATES PATENT OFFICE 1,959,620

LOCK NUT AND WASHER

Alexandre Auguste Eveno, Boulogne sur Seine, France

Application December 4, 1930, Serial No. 499,936
In France December 6, 1929

5 Claims. (Cl. 151—19)

The present invention relates to a lock nut comprising a portion shaped in such a manner as to act as a milling tool of which the teeth engage, at the moment of tightening, in the material of the member on which it is tightened. This engagement is increased by the vibrations which cause the nut, by reason of its shape, to become more and more tightly wedged in the material through which the bolt passes.

The invention also relates to a washer based on the same principles and capable of being used under an ordinary nut so as to render the nut unreleasable.

In order to leave no doubt as to the nature of the invention there are described hereinafter, but solely by way of example, various forms of construction with reference to the accompanying drawings, wherein:—

Figure 5 is an elevation of a milling nut with a conical projection and helicoidal teeth.

Figure 6 is a corresponding top plan showing the outline of the teeth.

Figure 7 shows various plan developments of the teeth.

Figure 8 is a demonstrating figure.

Figures 9 and 10 indicate a particular outline of the slots.

Figure 11 is a demonstrating figure.

Figure 12 is a sectional view of the threads of the nut in engagement with the threads of the bolt.

Figure 1:
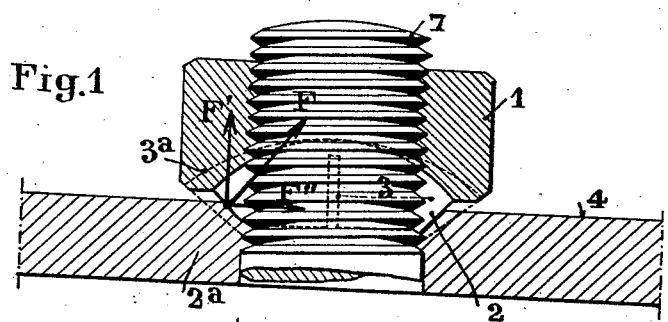
Figure 1 is a section of a milling nut according to the invention.
Figure 3:
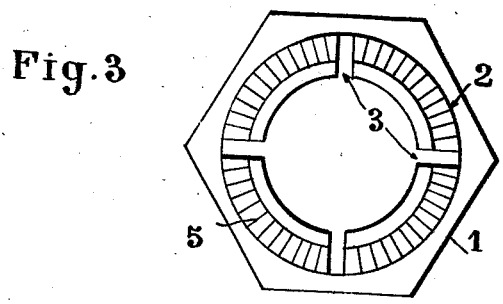
Figure 3 is a bottom plan of the nut in Figure 1.

Referring to the axial section in Figure 1 it will be seen that the nut 1 is provided on its lower face with a cone 2 which is sectioned by large slots 3, of variable number four, six or eight, according to the dimensions of the nut and which are extended in a circle, to the interior of the nut in such a manner as to intersect a certain number of threads. These slots are preferably obtained by a saw cut. This cone 2 is also fluted at 5 (Figure 3), either in a press or by shaping, in such a manner as to form an actual milling cutter of which the teeth are assumed to be straight in Figure 3.

This milling nut may be tempered by a blowpipe and oil or by any other means.

When tightening the nut on the metal member 4 to be secured the cone 2 as soon as it comes into contact with this member first removes any burrs resulting from the drilling of the bolt hole, and then by reason of its milling cutter it itself hollows out its seating in the metal member, first of all easily and then with more and more difficulty until it is locked.

It will be readily understood that at this moment the effort F (Figure 1) at right angles to the generating line of the cone 2 gives rise to two components one F' parallel to the axis and the other F'' at right angles to this axis, which components each contribute to render the nut unreleasable. The component F' applies a strong pressure upon all the threads in engagement with the nut in the longitudinal direction, whilst at the same time the component F'' produces the integral transverse locking of the threads engaged by the cone 2 and the slots 3 forming a very powerful wedge at the base of the nut. At the end of the tightening the teeth or striations 5 of the cone 2 slightly penetrate into the metal of the member 4 forming a second engagement which tends to increase with the vibrations, whilst the cone 2 tends to become wedged. The number of threads tightened according to the component F'' at right angles to the axis depends upon the inclination of the generating lines of the cone 2 and of its projection as also on the depth of the slots 3 in the interior of the nut.

This number reaches the maximum if the cone 2 forms the whole face of the base of the nut, as indicated in broken lines 2ª (Figure 1), the slots being arranged along the broken circle 3ª which may be enlarged so as to cover the faces themselves of the nut. If desired and particularly in connection with members of large dimensions the seating for the cone 2 can be prepared in advance, at least partly, particularly when it extends over the whole of the base 2ª.

Figure 4:
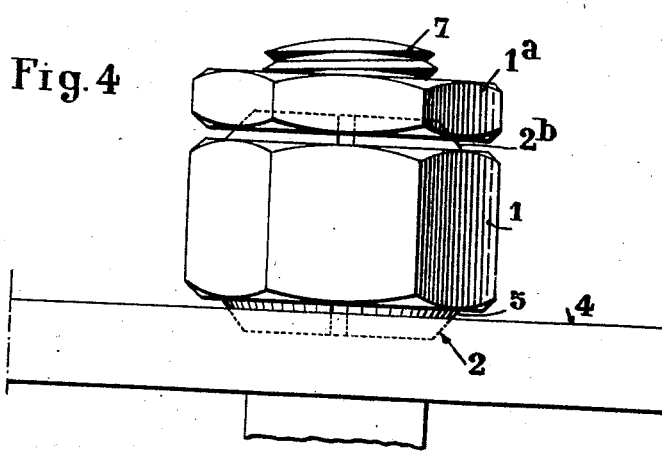
Figure 4 illustrates a complementary lock nut on top of the nut shown in Fig. 1.

The device above described and illustrated may also be reversed as is indicated at the upper portion of Figure 4 and it is then provided with a small lock nut 1ª which is made conical internally. In these particular cases there may be used a double cone on each side of the nut 1 (Figure 4).

The principle on which the milling nut is based may be applied to a milling washer adapted to render an ordinary nut unreleasable.

Figure 2:
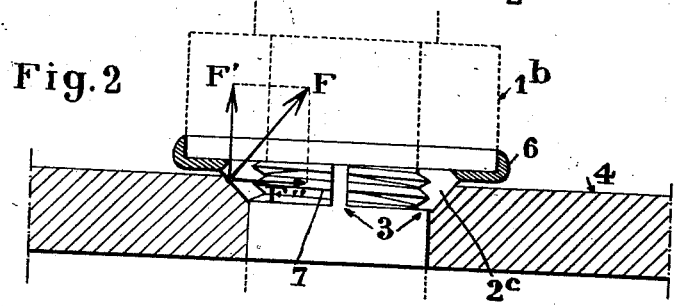
Figure 2 is a sectional view of a milling washer in accordance with the invention.

Figure 2 shows such a washer 6 into which the nut 1ᵇ is fitted, thus forming part thereof and moving the washer during the tightening operation. By locking itself on the bolt 7, the washer 6 prevents any releasing of the nut 1ᵇ in accordance with the principle of wedging previously described in connection with the milling nut. A milling washer of this type may be constructed, when manufactured, in such a manner as to be slightly springy so as to increase the longitudinal component F'. The angle of inclination of the generating lines of the cone 2 of the nut 1 or of the cone 2ᶜ of the washer 6 may be of any value in one direction or the other.

The teeth of the milling cutter of suitable outline are preferably such as to impart to this milling the desired resiliency. They may be used instead of elastic washers to absorb the vibrations and particularly counteract the effects of expansion or contraction of the bolt.

In order to obtain this result the striations 5 should be sufficiently deep, and their section preferably in the form of ratchets or saw teeth (Figure 6) tending to resiliently flatten out when the tightening takes place in the direction of the arrow $f'$. These teeth are pointed $5^c$ flat $5^d$ or rounded $5^e$ (Figure 7) according to the applications or the dimensions of the nut and according to the nature of the material which forms the member 4 to be held. This also determines their number and their projection as also the quality of the steel to be used for the manufacture of the nut.

The teeth are pressed into the member 4 at the moment of tightening, more or less deeply according to the shape of the teeth, and this slight penetration is increased by vibrators. According to the invention these teeth are made in such a manner that the penetration may be used, not only for preventing release, but also so that the nut tends to tighten itself.

For this purpose the teeth 5 on the nut 1 with a conical projecting base 2 should be inclined relatively to the generating lines of the cone, in the direction of tightening, in the form of helices 14 (Figure 5). In this manner the nut tends to some extent to screw itself into the member 4, whilst bearing on the screw thread.

This tendency when tightening is assisted by the flexibility and resiliency of the teeth and the vibrations themselves. Figure 18 shows how these different actions are composed. The elasticity which is exerted along $g$ and the vibrations which act along the centre line $n$ have as a resultant the force P in the direction of tightening and at right angles to the tangent $h$ of the helicoid at its centre of gravity. This helicoid tends to screw itself by pressure along this tangent $h$, the whole system finally giving rise to an integral resultant of the reactions $i$ in the direction of tightening.

This arrangement is of importance in cases where wear necessitates taking up the play automatically, especially for the fish plates which connect the rails of railways end to end.

The tightness may also be increased by slots $3^b$ directed along a tangent to the helicoid in elevation and tending towards a tangent to the plane of the screw thread (Figures 9 and 10) instead of being drawn in a plane passing through the generating line and the axis (Figures 5 and 6). Under these conditions the effort of radial wedging $F''$, determined by the cone (Figure 11) approaches a tangent to the screw thread and thus tends to lock the nut at an angle in the direction of tightening.

Referring to Figs. 9 and 10, it will be observed that the side-face of each sector is provided with helicoidal teeth, here shown as four in number for example, and designated $5^a$, $5^f$, $5^g$, and $5^h$. However, since the teeth $5^f$, $5^g$, and $5^h$ lie behind the tooth $5^a$, one may, if desired, dispense with teeth $5^f$, $5^g$, and $5^h$, retaining only the ratchet-like abutment $5^a$ in each of the sectors, leaving the rest of the side-face of each sector blank and smooth. Thus the milling-cutting structure of the present invention will be constituted by the six cutting edges $5^a$ alone, one such lying in each sector along the one side of said slot at the lagging or trailing edge of the sector.

The angle at the apex of the cone is defined in such a manner that the effort of wedging F at right angles to the generating line (Figure 11) gives two components. One in the axial direction F', smaller than that in the radial direction F'', and this in such a manner that the screw threads of the nut are completely wedged on those of the bolt without play $j$ (right-hand portion of Figure 12). This play which is usually found in ordinary nuts, in which the sole axial tension F' causes the upper portion of the screw threads of the nut to bear on the lower portion of the screw threads of the bolt (Figure 12 left-hand portion) gives rise to a hammering by inertia and an unscrewing as a result of the vibrations. These vibrations $t$ add their action to that of F in a screw with a conical projecting base and give $t'$ and $t''$ (Figure 11).

My invention is not limited to the structures set forth in the accompanying drawings and specification, as other variations or suggestions may be made which fall within the scope of the appended claims.

I claim:—

1. A lock-nut, comprising a screw portion having its lower face formed into a hollow cone, said cone having slots therein forming the cone into a plurality of milling sectors for wedging itself into the nut seat by a milling action, said slots extending vertically and helicoidally in a direction substantially opposite to that taken by the nut in backing off the screw, each sector having at least one cutting tooth lying along one side of said slot at the trailing edge of the sector, whereby said tooth is made to bite into the nut seating when the nut tends to back off under vibrations.

2. A lock nut having its lower face in the form of a cone, said face having a plurality of slots dividing it into flexible sectors susceptible of radial elastic deformation for jam-wedging into the bolted-member under regular tightening forces, said face having formed therein ratchet- or spray-like formations for milling into the bolted-member under backing-off forces.

3. A lock nut having its lower face in the form of a cone, said face having a plurality of slots dividing it into flexible sectors susceptible of radial elastic deformation for jam-wedging into the bolted-member under regular tightening forces, said faces having formed therein ratchet-like formations for engaging into the bolted-member under backing-off forces, said ratchet-like formations re-entering the nut.

4. A lock nut having its lower face in the form of a cone, said face having formed thereon teeth of helicoidal shape inclined in one direction to impart to the nut a tightening tendency under the action of vibrations, said face further having a plurality of slots dividing it into flexible sectors susceptible of radial elastic deformation for jam-wedging into the bolted-member under regular backing-off forces.

5. A lock nut having its lower face in the form of a cone, said face having formed thereon teeth of helicoidal shape inclined in one direction to impart to the nut a tightening tendency under the action of vibrations, and having formed therein a plurality of slots dividing it into flexible sectors susceptible of radial elastic deformation for jam-wedging into said bolted-member under regular tightening forces, said slots being also of helicoidal shape in one direction to further assist in imparting to the nut a tightening tendency from the action of vibrations.

ALEXANDRE AUGUSTE EVENO.